United States Patent [19]
Kato

[11] Patent Number: 4,650,291
[45] Date of Patent: Mar. 17, 1987

[54] ZOOM LENS

[75] Inventor: Masatake Kato, Tokyo, Japan

[73] Assignee: Canon Kabushiki Kaisha

[21] Appl. No.: 522,043

[22] Filed: Aug. 10, 1983

[30] Foreign Application Priority Data

Aug. 13, 1982 [JP] Japan ................................. 57-140676
Aug. 18, 1982 [JP] Japan ................................. 57-143075

[51] Int. Cl.⁴ ...................... G02B 15/14; G02B 15/20
[52] U.S. Cl. .................................................. 350/427
[58] Field of Search ................................. 350/427, 428

[56] References Cited

U.S. PATENT DOCUMENTS 4,492,437  1/1985  Masumoto et al. .................. 350/428

FOREIGN PATENT DOCUMENTS 0025747  2/1979  Japan.
0078513  5/1982  Japan.

Primary Examiner—John K. Corbin
Assistant Examiner—Rebecca D. Gass
Attorney, Agent, or Firm—Toren, McGeady and Goldberg

[57] ABSTRACT

A zoom lens having, from front to rear, a zoom section having a plurality of lens groups movable for zooming, and an image forming section which is stationary during zooming, wherein a first lens group counting from the front in the zoom section is of positive refractive power, and a lens group F constituting part of the image forming section is made movable for focusing. A proper range of focal lengths of the aforesaid lens group F related with that of the image forming section is set forth to achieve good correction of aberrations.

2 Claims, 95 Drawing Figures

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

FIG.8-1　　FIG.8-2　　FIG.8-3
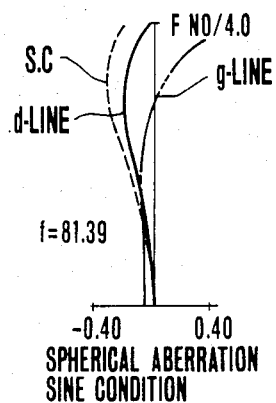 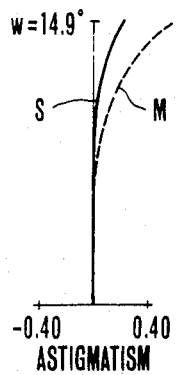 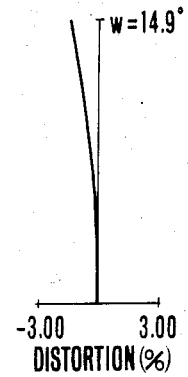
FIG.8-4　　FIG.8-5　　FIG.8-6
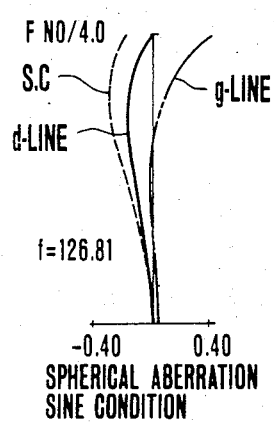 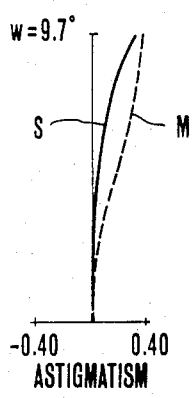 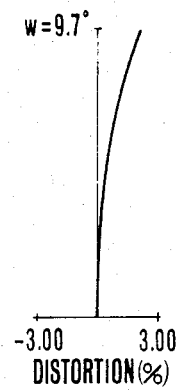
FIG.8-7　　FIG.8-8　　FIG.8-9
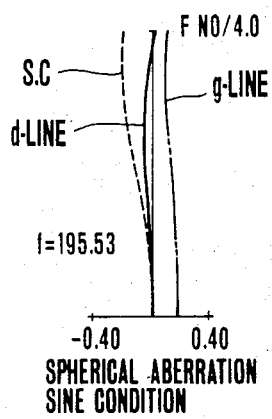 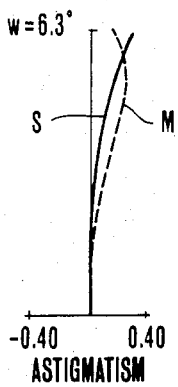 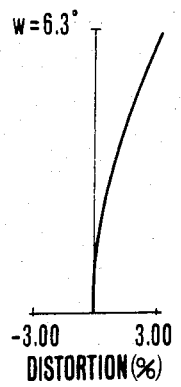

S.C, F NO/4.5, d-LINE, g-LINE
f=83.8
-0.50  0.50
SPHERICAL ABERRATION
SINE CONDITION y'=21.6
S, M
-0.50  0.50
ASTIGMATISM y'=21.6
-3.00  3.00
DISTORTION(%)

d-LINE, F NO/4.5, S.C, g-LINE
f=146.3
-0.50  0.50
SPHERICAL ABERRATION
SINE CONDITION y'=21.6
S, M
-0.50  0.50
ASTIGMATISM y'=21.6
-3.00  3.00
DISTORTION(%)

F NO/4.5, S.C, g-LINE, d-LINE
f=197.3
-0.50  0.50
SPHERICAL ABERRATION
SINE CONDITION y'=21.6
S, M
-0.50  0.50
ASTIGMATISM y'=21.6
-3.00  3.00
DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

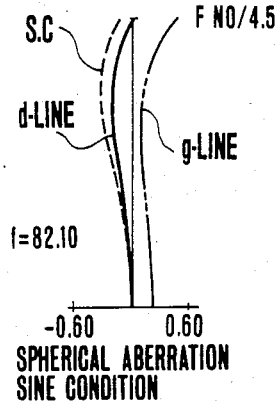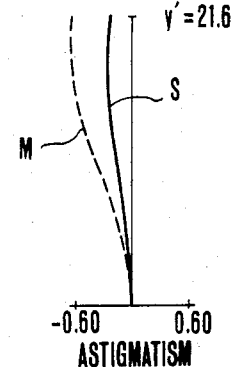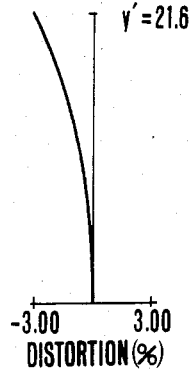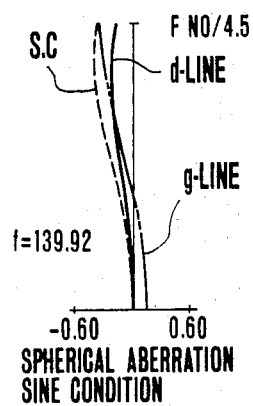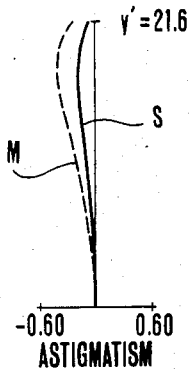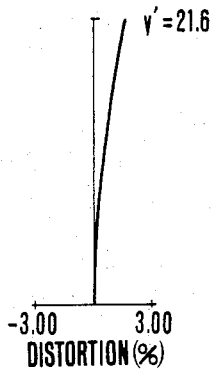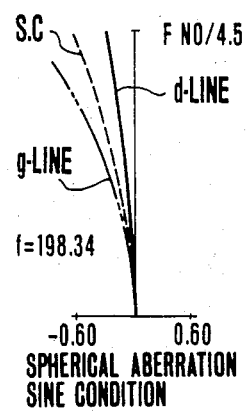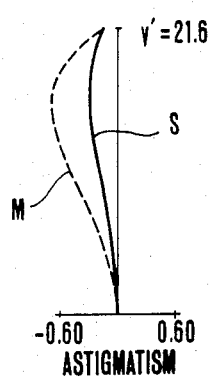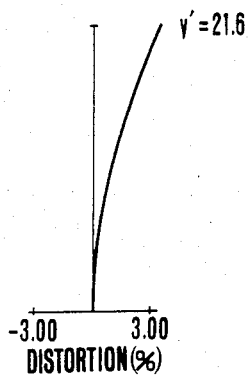

ZOOM LENS

BACKGROUND OF THE INVENTION

1. Field of the Invention

This invention relates to zoom lenses, and, more particularly, to zoom lenses of which focusing is performed by moving a lens group constituting part of the image forming section in the rear of the zoom section.

2. Description of the Prior Art

Conventionally, in the field of semi- and super-telephoto lenses, what is called "rear" or "inner" focus, that is, the focusing method by moving other than the first lens group, counting from the front has been employed in order to effect focusing easily and quickly. These focusing methods were designed to overcome the drawbacks which were encountered when other generally adopted methods of focusing such as by moving the entire lens system or by moving the front lens members, were applied to lenses of relatively long total length and heavy weight. This was done because a great increase in the driving torque of the helicoid or other operating mechanism must be called for, or because the center of gravity of the lens system changes its position as focusing is performed. Such focusing provision has generally been made at one of the lens groups which lies relatively nearer to the film plane and is of small diameter.

The use of this rear focusing method was advantageous in that it is made easy to reduce the total focusing movement as far as possible without involving any loss in the imaging performance by giving the focusing lens group a proper refractive power and optical arrangement.

Particularly in application to auto-focus cameras, this produces many great advantages in that (a) by virtue of the small-sized and light-weight focusing lens group, focusing can be operated without unduly large stress, in that (b) since the focusing lens group takes its place relatively near the camera body, it is easy to establish a reliable signal transmission between the operating mechanism and a control mechanism in the camera body, and in that (c) because the total focusing movement can be minimized, feedback is easily provided in the in-focus position detecting system.

Similarly, in the field of art of zoom lenses, the above-stated advantages of the rear focusing method are valid. In particular, with regard to the aims of achieving great increases in the zoom ratio and relative aperture, the use of the front focusing method results in an increase in the total length of the lens system, and also an increase in the diameter of the front or focusing lens members.

As a conventional means for improving such problem, a proposal making use of the rear focusing method in the zoom lens is made in Japanese Laid-Open Patent Application No. Sho 57-78513. This approach is that instead of making the focusing provision at the front lens members as had so far prevailed in the prior art, focusing is performed by a lens group constituting part of the image forming section which remains stationary during zooming, while the first lens group in the entire lens system is left stationary during zooming and focusing.

Another proposal in view of extending the zooming range, and minimizing the bulk and size of the entire lens system, by Japanese Laid-Open Application Nos. Sho 53-34539 and 54-25747 provides that the first lens group of positive power is otherwise made to move forward as zooming is effected from the wide angle to the telephoto position, thus increasing the rate of change of image magnification of the second lens group as the variator.

Since, however, the distance from the film plane to the first lens group varies with variation of the focal length of the entire system, the required amount of movement of the focusing lens for the same object distance measured from the film plane is caused to differ with focal length. This implies that after the in-focus condition has been established at a certain focal length, when zooming is allowed to proceed, the image plane will shift. Also in the zoom lens of the type in which the first lens group moves forward when zooming from the wide angle to the telephoto position, the effective diameter of the front lens members which is determined by the off-axis oblique pencil of light rays for the telephoto position is necessarily increased. Since focusing is effected down to shorter object distances, if the front member is selected for focusing purposes, a further increase in the effective diameter of the front lens member is called for.

To overcome these drawbacks, adoption of the rear focusing method in the zoom lens of the character described is considered. Focusing of the zoom lens is performed by a rear lens member, the focusing movement of the rear lens member from a position for an infinitely distant object to a position for a given object distance varies inconveniently as a function of the focal length of the entire lens system. Therefore, a change in the focal length as sensed by a suitable method has to be factored into the required amount of movement of the rear lens member by a computer or by an operative connection between the zoom actuator and an auto-focus apparatus of the TTL type. As a matter of course, it is also possible to adopt this method even in the zoom lens having the focusing provision at the front member. Since, however, the front or focusing lens member is of large size and heavy weight and because the structure of the operating mechanism becomes complicated, it is recommended that such factoring system is advantageously applied to the rear focusing method. It is further to be noted that a remarkable reduction in the diameter of the front member can be achieved since the front lens member remains stationary during focusing.

For use of the zoom lens employing the rear focusing method, mention may be made of the disclosures of U.S. Pat. Nos. 3,391,973, 4,043,642 and 4,054,372.

SUMMARY OF THE INVENTION

It is an object of the present invention to provide a compact zoom lens having the focusing provision in a reduced number of lens elements with the total focusing movement being shortened to effect an equivalent focusing range, while still permitting good correction of aberrations.

To achieve this, a lens system, according to the present invention has a feature that, from front to rear, a zoom section having a plurality of lens groups movable for zooming, is followed by an image forming section which remains stationary during zooming, wherein a first lens group counting from the front in said zoom section is of positive refractive power, and a lens group F constituting part of said image forming section is made movable for focusing, whereby the focal lengths of said image forming section and said lens group is appropriately chosen to achieve good correction of aberrations.

BRIEF DESCRIPTION OF THE DRAWINGS

FIGS. 6-1 through -9 and FIGS. 7-1 through -9 are graphic representations of the lens of FIG. 1 with an object at infinity and in a short distance respectively.

FIGS. 8-1 through -9 and FIGS. 9-1 through -9 are similar to the above except for the lens of FIG. 2.

FIGS. 10-1 through -9 and FIGS. 11-1 through -9 are similar to the above except for the lens of FIG. 3.

FIGS. 12-1 through -9 and FIGS. 13-1 through -9 are similar to the above except for the lens of FIG. 4.

FIGS. 14-1 through -9 and FIGS. 15-1 through -9 are similar to the above except for the lens of FIG. 5.

DETAILED DESCRIPTION OF THE PREFERRED EMBODIMENTS

Figure 1:
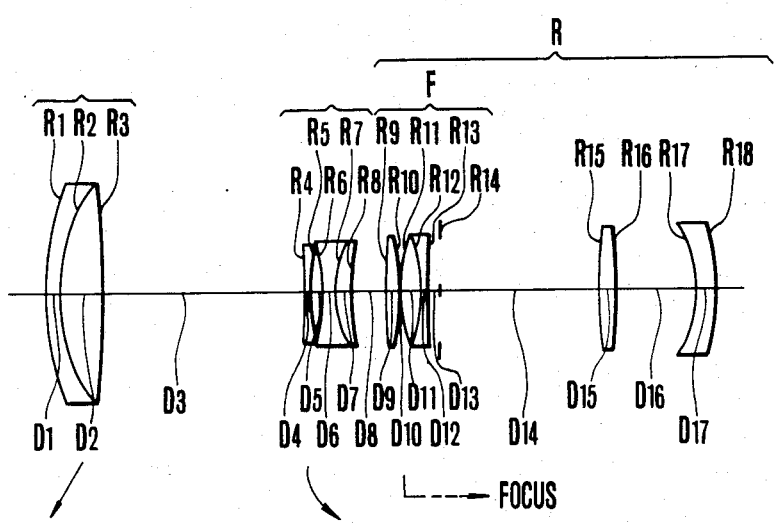
FIGS. 1 to 5 are longitudinal section views of specific embodiments 1 to 5 of zoom lenses according to the present invention respectively.
Figure 2:
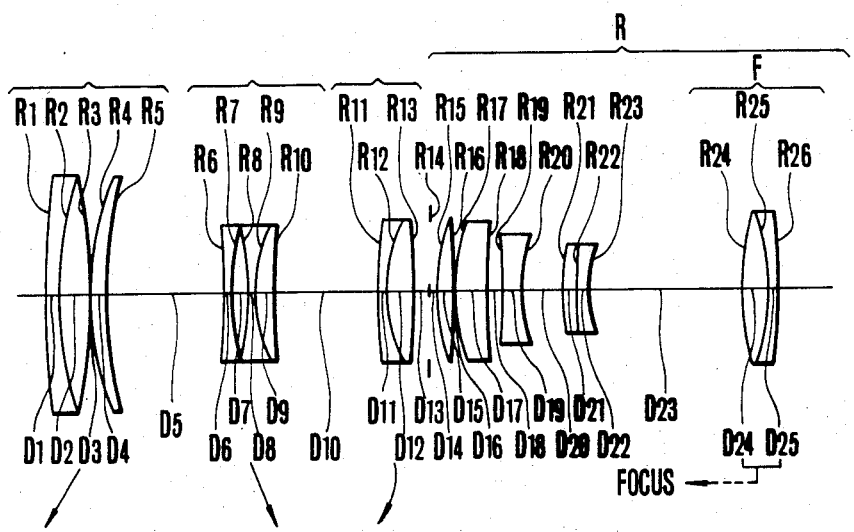
Figure 3:
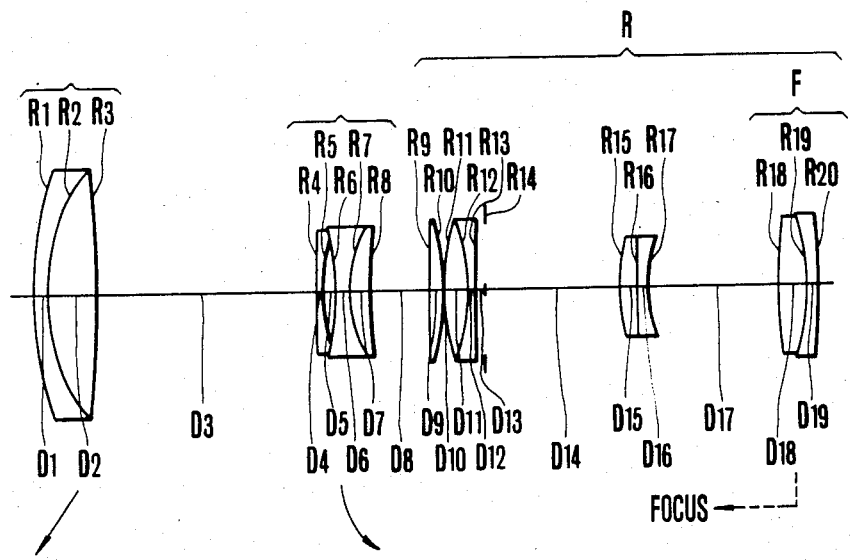
Figure 4:
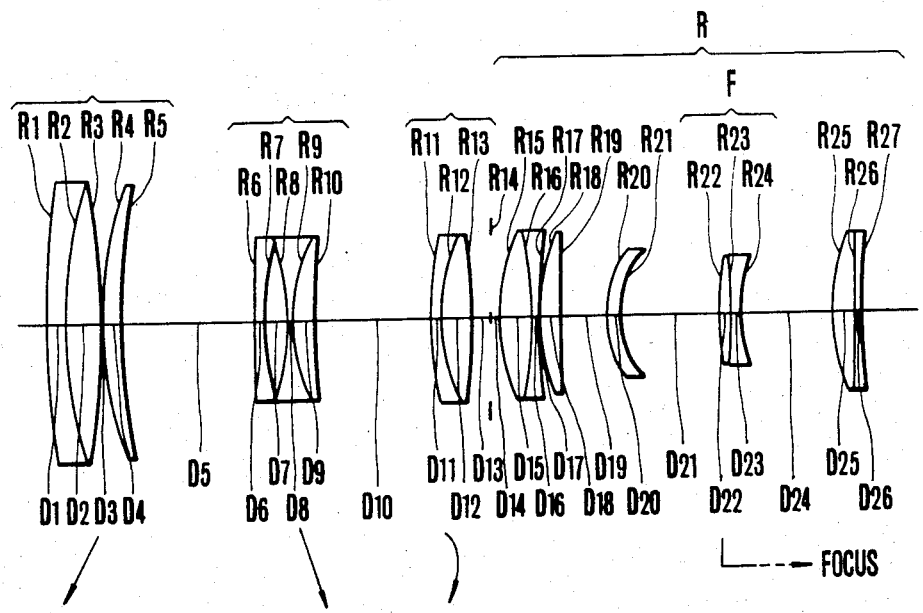
Figure 5:
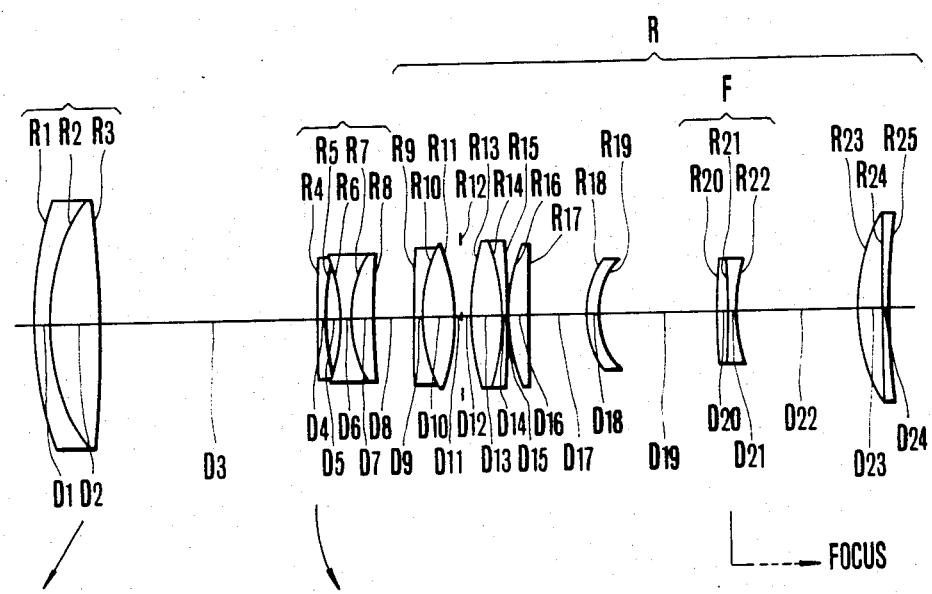

In the present invention, a zoom section having a plurality of lens groups which move to effect zooming is followed by an image forming section which is stationary during zooming, wherein the refractive power of the first lens group in the zoom section is made positive, and a lens group F constituting part of the image forming section is made movable to effect focusing, whereby when the aforesaid lens group F is of positive refractive power, its focal length $f_F$ satisfies the following condition:

$$0.5 < f_F/f_R < 6 \qquad (1)$$

where $f_R$ is the focal length of the image forming section. Also when the aforesaid lens group F is of negative refractive power, its focal length $f_F$ is within the following limits:

$$0.4 < |f_F/f_R| < 4 \qquad (2)$$

By the present invention, the zoom type that the frontmost or first lens group is moved during zooming is employed to assist in extending the range of variation of the image magnification resulting from the movement of the lens group or groups that follow or follows the first lens group so that a prescribed zoom ratio is advantageously obtained with the limitation of the bulk and size of the complete zoom lens to a minimum. In addition thereto, by imparting independent movement into the one of the lens groups fixed during zooming which has a specific refractive power to effect focusing, the diameter of the front lens members is prevented from increasing. And by setting forth inequalities of condition (1) for the lens group F when of positive refractive power and inequalities of condition (2) when of negative refractive power, as the necessary number of lens elements of group F may be lessened, the focusing operation is made easy to perform, and the complete lens is shortened also in the longitudinal direction, while still permitting good stability of aberration correction throughout the focusing range to be achieved.

When the upper limit of condition (1) or of condition (2) is exceeded, the total focusing movement becomes so large that in order to avoid mechanical interference between the lens groups, an appreciable increase in the total length of the lens system is necessarily involved. Thus, an advantage in the compactness of the lens system is sacrificed. Conversely, when the lower limit is exceeded, as the refractive power of the aforesaid focusing lens group is strengthened, it becomes difficult to maintain the aberrations stable.

The present new principle of construction of the focusing lens group F with its requirement that the abovestated condition (1) or condition (2) be satisfied in the image forming section of whatever type establishes a possibility of realizing a zoom lens of compact form while maintaining good stability of aberration correction throughout the zooming and focusing ranges.

Particularly regarding the telephoto lenses, from the standpoint of shortening the entire lens system in the longitudinal direction to a compact proportion, most of their image forming sections take such form as comprising a front part which is a lens group of strong positive power, and a rear part which is a lens group either of strong negative power or of weak positive power, namely, the so-called telephoto type. As a result of making the focusing provision in the rear part of the negative lens group a drawback arises that, as focusing is effected down to shorter object distances, the negative lens group has to be moved as far rearward so as not to secure the necessary back focal distance. Also, the use of the rear part of the weak positive lens group in focusing though allowing forward movement to take place for shorter object distances leads to necessarily increase the total focusing movement. Conversely, when the rear part is made up of a lens group of strong positive power, though the total forward focusing movement is reduced, the power distribution characteristic of the telephoto type is broken. This makes it difficult to take the telephoto ratio of the image forming section at a small value.

To attain further improved results, according to the present invention, it is preferred to construct the lens group F with inclusion of at least one doublet consisting of a positive lens and a negative lens cemented together at their adjoining surfaces, thereby giving an advantage that chromatic aberrations are maintained stable throughout the focusing range, and as the number of lens members is so small, the focusing operation becomes easy.

It is to be noted that the image forming section is preferably formed to an overall refractive power of positive sign in view of maintaining good stability of aberration correction throughout the entire zooming range and further making sure the prescribed back focal distance is obtained.

It is also to be noted that when the lens group is of negative refractive power, it is preferred that on the object side of the lens group F a meniscus-shaped lens of forward convexity is arranged, and on the image side is a lens of positive power, and that focusing from an infinitely distant object to an object at a shorter distance is performed by moving the aforesaid lens group F toward the rear.

These lenses are provided mainly for the purpose of removing variation of aberrations with focusing. In greater detail, the aforesaid meniscus-shaped lens is provided to compensate for change of spherical aberration resulting from movement of the focusing lens group F, and the positive lens that is provided on the image side of the focusing lens group F is to well correct pincushion type distortional aberration which will produce when the total focusing movement is intentionally reduced by strengthening the refractive power of the focusing lens group F.

It is also preferred to construct the positive lens that follows the focusing lens group F in the form of a doublet consisting of a positive and a negative lens cemented together, thereby good correction of chromatic aberrations and particularly lateral chromatic aberration can be maintained stable during focusing.

Examples of specific zoom lenses of the invention can be constructed in accordance with the numerical data given in the following tables for the radii of curvature, R, of the lens surfaces and the reflection mirror, the lens thicknesses and air separations, D, and the refractive indices, N, and Abbe numbers, $\nu$, of the glasses of the lens elements with the subscripts consecutively numbered from front to rear.

Figures 1, 6:
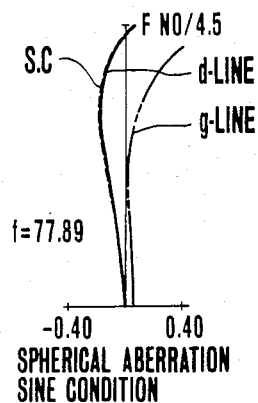
Figures 2, 6:
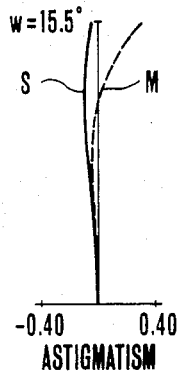
Figures 3, 6:
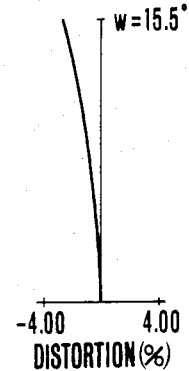
Figures 4, 6:
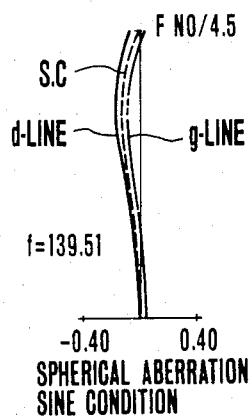
Figures 5, 6:
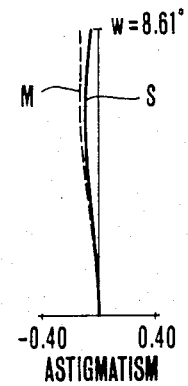
Figure 6:
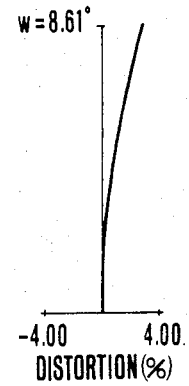
Figures 6, 7:
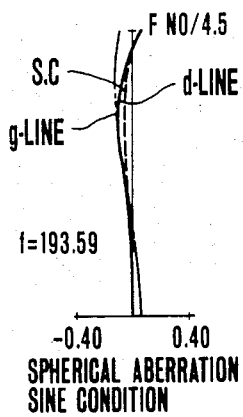

In Numerical Example 1, the image forming section is in between R9 and R18 with a lens group (R9 to R13) of positive refractive power just in front of a diaphragm being made movable rearward to effect focusing down to shorter object distances. The use of this method provides assurance that the focusing accuracy is improved when the finder image is formed with a light beam taken off at a point in front of the diaphragm since the focusing is not influenced by the size of diaphragm aperture opening. Aberrations of the comlete lens for an infinitely distant object are depicted in FIGS. 6-1 through -9, and those for an object at a distance of 5 meters in FIGS. 7-1 through -9. This focusing range requires a total movement of 2.36 mm when in the telephoto position. It should be recognized that though, in this specific embodiment, the shorter limit of the range of object distances is made the same when in the wide angle and telephoto positions, it is not always necessary to set forth the same value of the shorter limit of the object distance range for both wide angle and telephoto positions. When in the wide angle position, the focusing lens group may be otherwise moved beyond the above-stated range of movement toward the rear so that the object distance range is extended to further shorter object distances.

Figures 6, 7, 8:
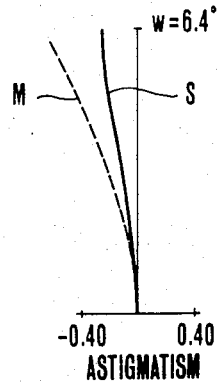
Figures 6, 7, 8, 9:
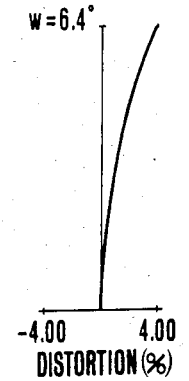
Figures 1, 7:
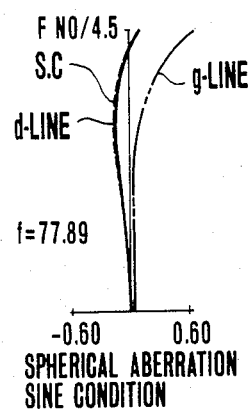
Figures 2, 7:
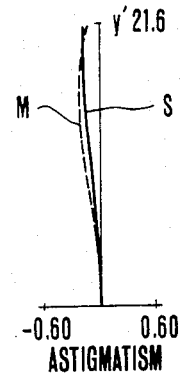
Figures 3, 7:
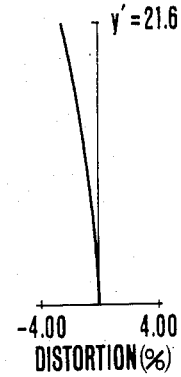
Figures 4, 7:
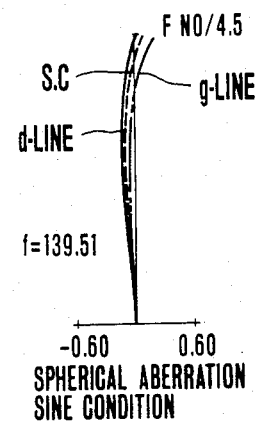
Figures 5, 7:
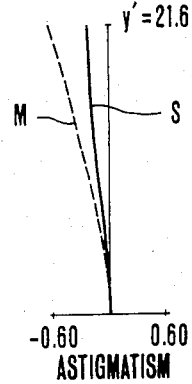
Figures 6, 7:
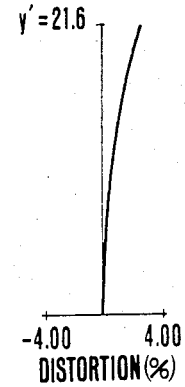
Figure 7:
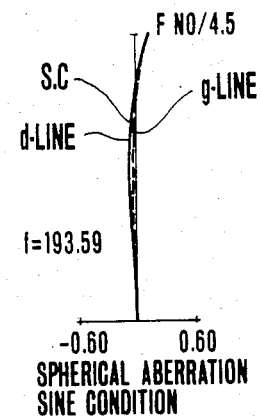
Figures 7, 8:
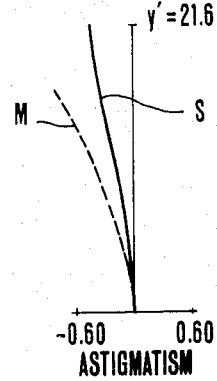
Figures 7, 8, 9:
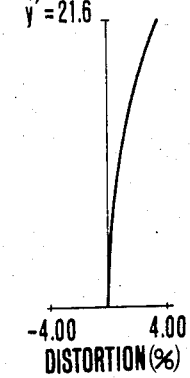
Figures 1, 9:
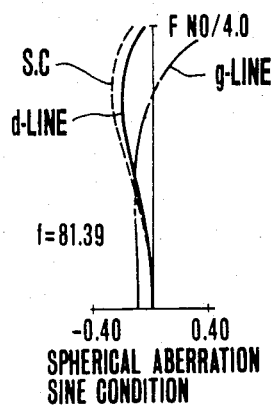
Figures 2, 9:
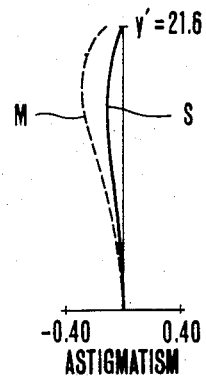
Figures 3, 9:
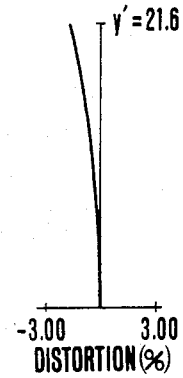
Figures 4, 9:
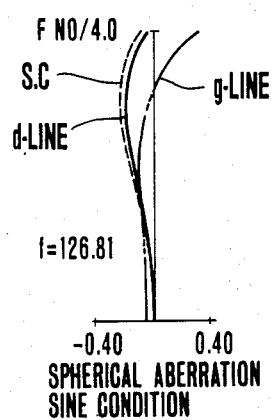
Figures 5, 9:
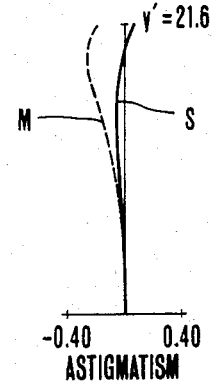
Figures 6, 9:
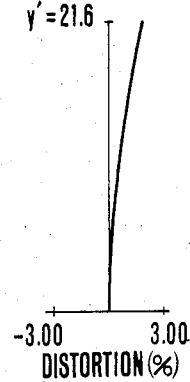
Figures 7, 9:
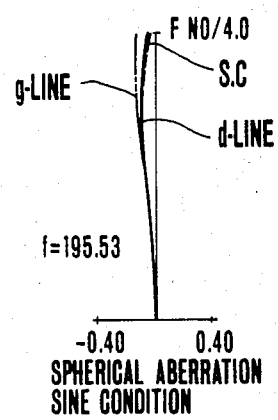
Figures 8, 9:
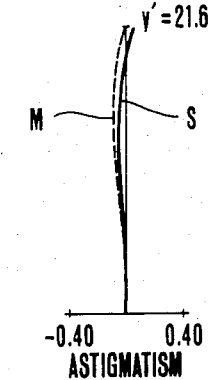
Figure 9:
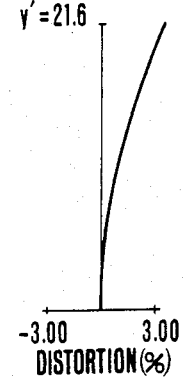

In Numerical Example 2, the image forming section is in between R15 and R26 with a rearmost lens group (R24 to R26) of positive power being made movable for focusing. Aberrations with an object at infinity are depicted in FIGS. 8-1 through -9, and with an object at a finite distance of 2.5 meters in FIGS. 9-1 through -9. This focusing range is available by a total axial movement of 21.74 mm when in the longest focal length positions.

Figures 1, 10:
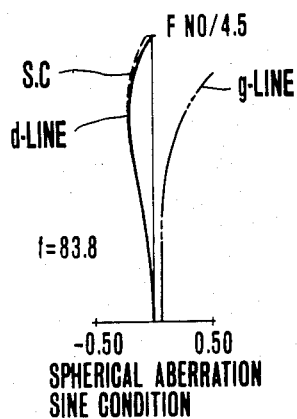
Figures 2, 10:
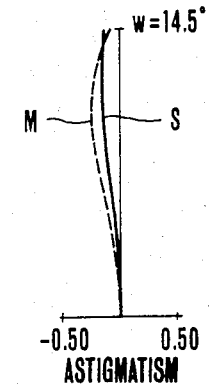
Figures 3, 10:
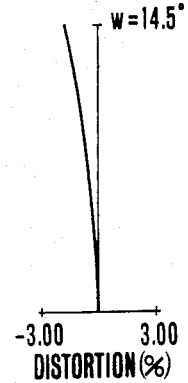
Figures 4, 10:
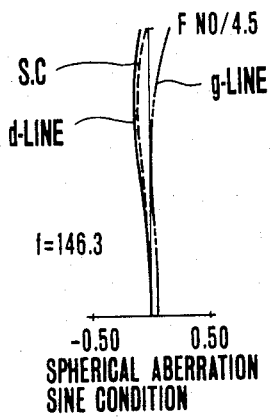
Figures 5, 10:
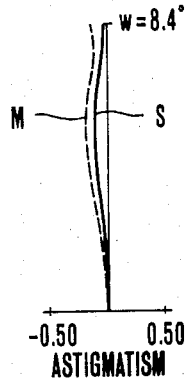
Figures 6, 10:
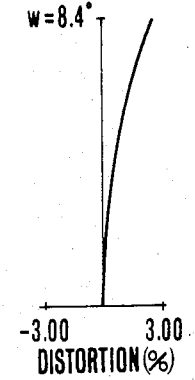
Figures 7, 10:
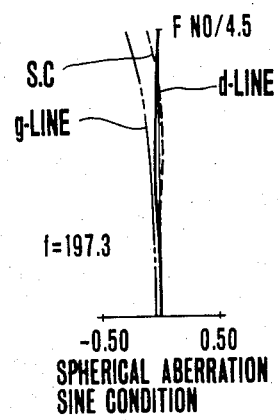
Figures 8, 10:
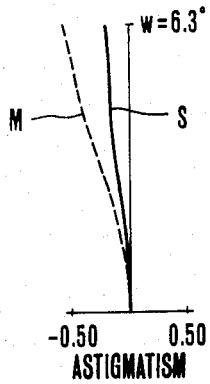
Figures 9, 10:
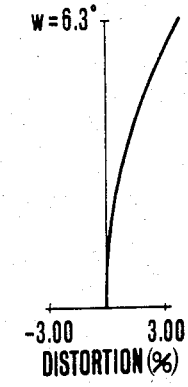
Figures 1, 11:
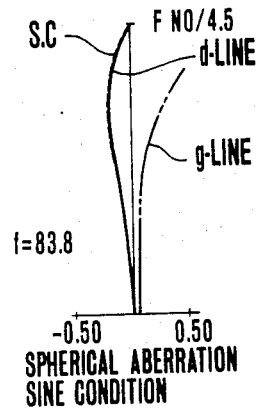
Figures 2, 11:
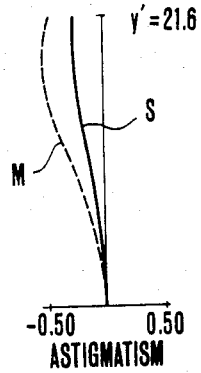
Figures 3, 11:
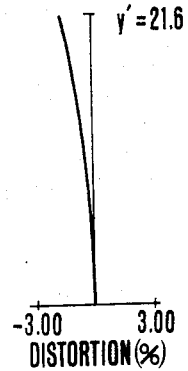
Figures 4, 11:
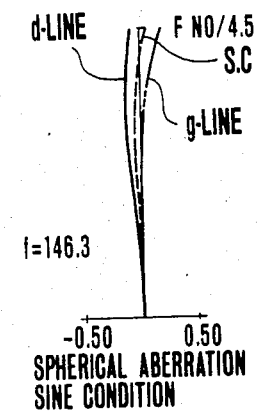
Figures 5, 11:
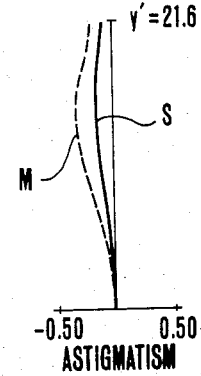
Figures 6, 11:
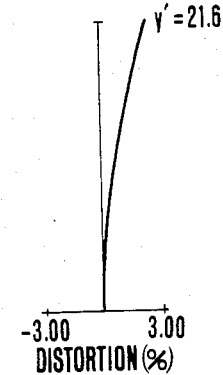
Figures 7, 11:
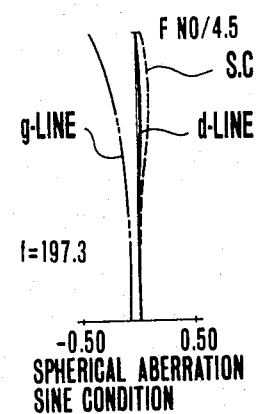
Figures 8, 11:
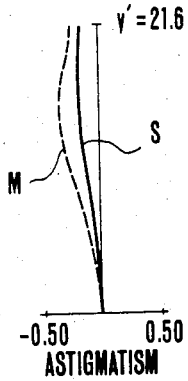
Figures 9, 11:
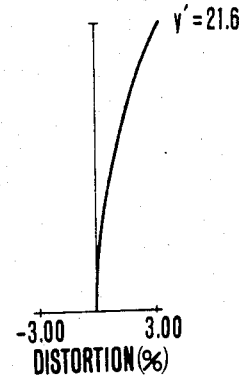

In Numerical Example 3, the image forming section is in between R9 and R20. Similar to Example 2, a rearmost positive lens group (R18 to R20) is used in focusing with variations of aberrations with an object at infinity and at a finite distance of 4 meters as depicted in FIGS. 10-1 through -9 and FIGS. 11-1 through -9 respectively. The required total focusing movement is 14.90 mm when in the longest focal length positions.

Figures 1, 12:
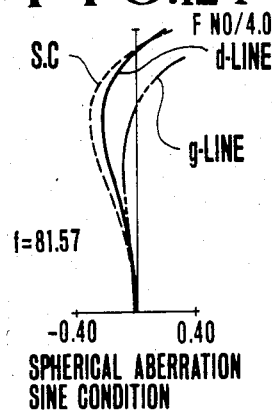
Figures 2, 12:
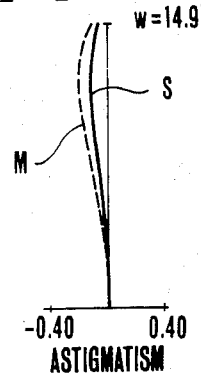
Figures 3, 12:
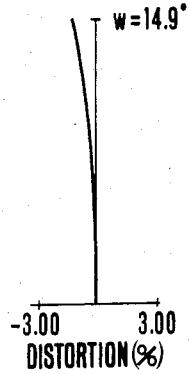
Figures 4, 12:
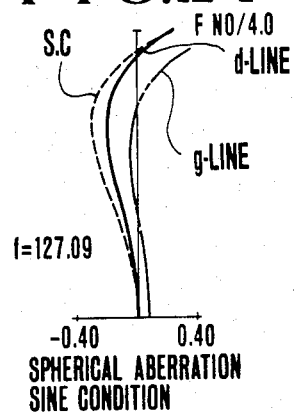
Figures 5, 12:
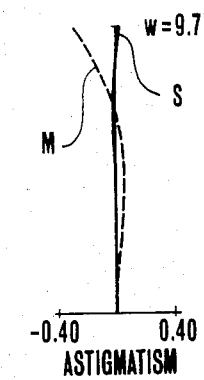
Figures 6, 12:
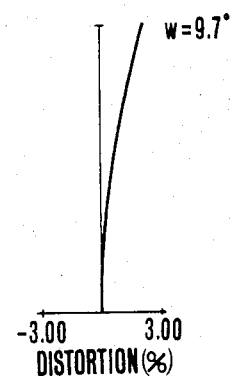
Figures 7, 12:
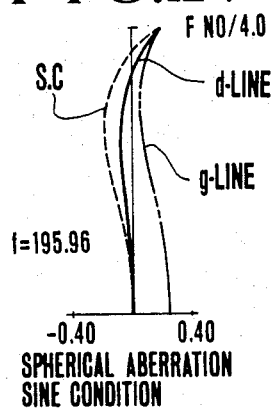
Figures 8, 12:
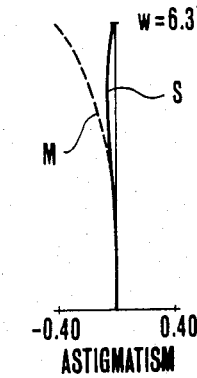
Figures 9, 12:
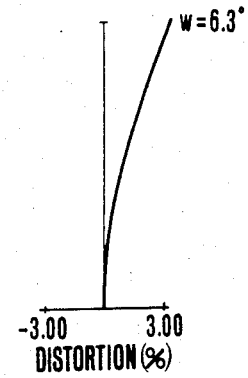
Figures 1, 13:
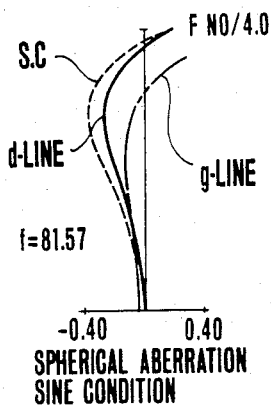
Figures 2, 13:
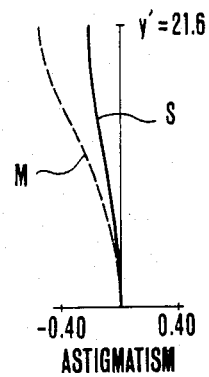
Figures 3, 13:
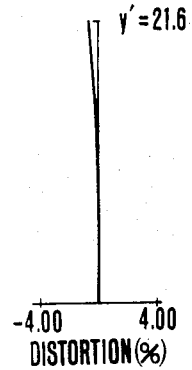
Figures 4, 13:
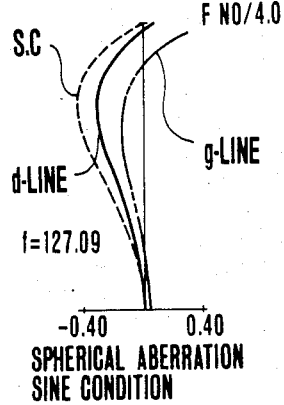
Figures 5, 13:
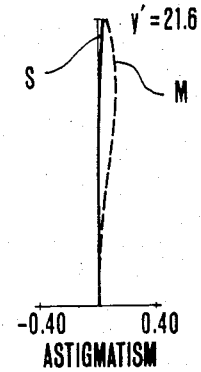
Figures 6, 13:
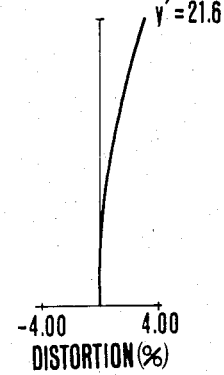
Figures 7, 13:
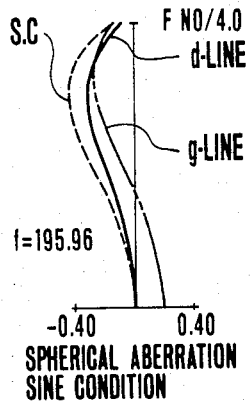
Figures 8, 13:
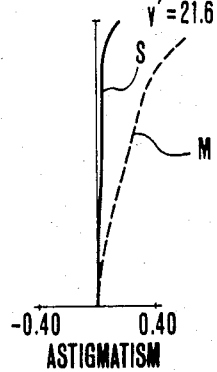
Figures 9, 13:
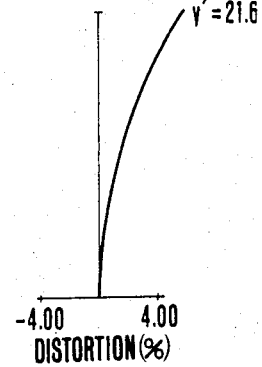

In Numerical Example 4, focusing is performed by a lens group defined by R22 and R24 in the image forming section of from R15 to R27. The first lens group comprises lenses from R1 to R5, and the varifocal lens group comprises lenses from R6 to R13, wherein R6 to R10 define one lens group, and R11 to R13 define another lens group. When focused on an object at infinity, the system has aberrations depicted in FIGS. 12-1 through -9. With the focusing lens group after having moved rearward by 2.35 mm when in the shortest focal length positions and by 14.70 mm when in the longest focal length positions to effect focusing to a finite object distance of 1.8 meters, resultant aberrations are depicted in FIGS. 13-1 through -9.

Figures 1, 14:
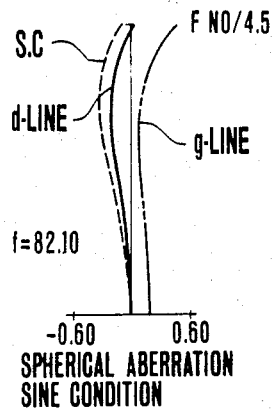
Figures 2, 14:
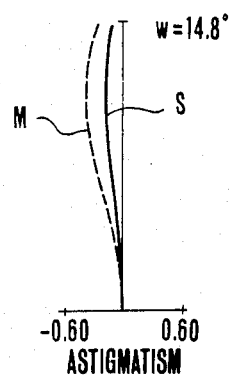
Figures 3, 14:
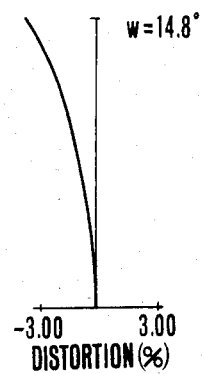
Figures 4, 14:
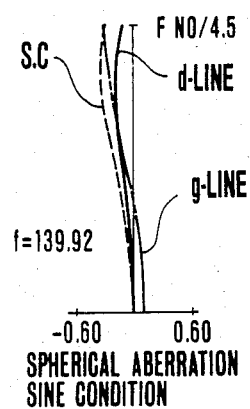
Figures 5, 14:
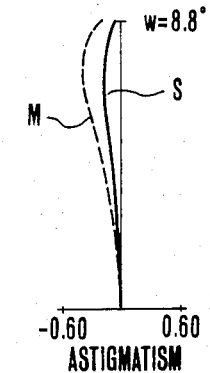
Figures 6, 14:
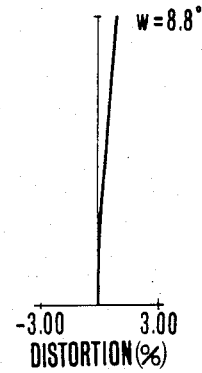
Figures 7, 14:
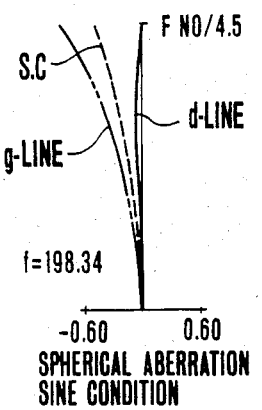
Figures 8, 14:
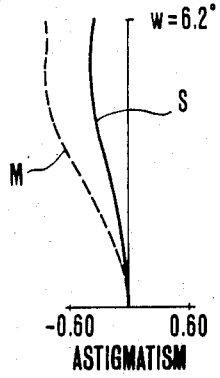
Figures 9, 14:
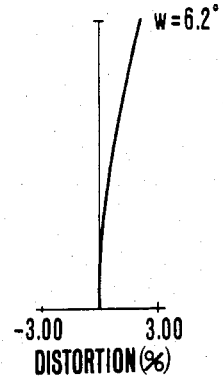

In Numerical Example 5, focusing is performed by a lens group of from R20 to R22 in the image forming section R9 to R25. The first lens group has lenses from R1 to R3, and the variator is a group of lenses from R4 to R8. With the focusing lens group on an infinitely distant object, the entire system has aberrations depicted in FIGS. 14-1 through -9. When focused down to an object at a finite distance of 3 meters, it has aberrations depicted in FIGS. 15-1 through -9. The required total focusing movement is 1.60 mm when in the wide angle positions, and 9.84 mm when in the telephoto positions.

Numerical Example 1
F = 77.89 –193.59  FNO = 1:4.5  2ω = 12.8°–31.0°

| | | | | | | | |
|---|---|---|---|---|---|---|---|
| | | R1 = | 88.52 | D1 = | 2.60 | N1 = 1.80518 | ν1 = 25.4 |
| | | R2 = | 44.81 | D2 = | 9.30 | N2 = 1.63930 | ν2 = 44.9 |
| | | R3 = | −326.99 | D3 = | Variable | | |
| | | R4 = | −194.94 | D4 = | 1.45 | N3 = 1.77250 | ν3 = 49.6 |
| | | R5 = | 60.82 | D5 = | 2.35 | | |
| | | R6 = | −53.91 | D6 = | 2.50 | N4 = 1.77250 | ν4 = 49.6 |
| | | R7 = | 27.40 | D7 = | 4.10 | N5 = 1.84666 | ν5 = 23.9 |
| | | R8 = | 187.07 | D8 = | Variable | | |
| | | R9 = | 209.26 | D9 = | 2.60 | N6 = 1.69350 | ν6 = 53.2 |
| | | R10 = | −65.14 | D10 = | 0.15 | | |
| | F | R11 = | 46.86 | D11 = | 4.80 | N7 = 1.67003 | ν7 = 47.3 |
| | | R12 = | −37.24 | D12 = | 1.50 | N8 = 1.84666 | ν8 = 23.9 |
| | | R13 = | 1223.59 | D13 = | 2.50 | | |
| R | | R14 = | Stop | D14 = | 35.20 | | |
| | | R15 = | 127.06 | D15 = | 3.50 | N9 = 1.58913 | ν9 = 61.0 |
| | | R16 = | −82.62 | D16 = | 17.50 | | |
| | | R17 = | −29.18 | D17 = | 4.30 | N10 = 1.62280 | ν10 = 57.0 |
| | | R18 = | −63.65 | | | | |

| | | | |
|---|---|---|---|
| f | 77.89 | 139.51 | 193.59 |
| D3 | 1.57 | 44.63 | 59.83 |
| D8 | 14.80 | 7.74 | 1.55 |
| $f_F$ = 43.18 | $f_R$ = 36.75 | | |

Numerical Example 2
F = 81.39–195.53  FNO = 1:4.0  2ω = 12.6°–29.8°

| | | | | |
|---|---|---|---|---|
| R1 = | 253.45 | D1 = | 3.00 | N1 = 1.80518  ν1 = 25.4 |

-continued

Numerical Example 2
F = 81.39–195.53  FNO = 1:4.0  2ω = 12.6°–29.8°

R {
| | | | | | | |
|---|---|---|---|---|---|---|
| R2 = | 91.71 | D2 = | 7.10 | N2 = 1.58913 | ν2 = | 61.0 |
| R3 = | −171.64 | D3 = | 0.12 | | | |
| R4 = | 76.21 | D4 = | 4.00 | N3 = 1.58913 | ν3 = | 61.0 |
| R5 = | 189.71 | D5 = | Variable | | | |
| R6 = | −297.10 | D6 = | 1.65 | N4 = 1.71300 | ν4 = | 53.8 |
| R7 = | 60.50 | D7 = | 3.42 | | | |
| R8 = | −73.78 | D8 = | 1.65 | N5 = 1.71300 | ν5 = | 53.8 |
| R9 = | 38.47 | D9 = | 4.10 | N6 = 1.80518 | ν6 = | 25.4 |
| R10 = | 281.86 | D10 = | Variable | | | |
| R11 = | 101.41 | D11 = | 1.70 | N7 = 1.64769 | ν7 = | 33.8 |
| R12 = | 34.35 | D12 = | 6.20 | N8 = 1.58913 | ν8 = | 61.0 |
| R13 = | −131.00 | D13 = | Variable | | | |
| R14 = | Stop | D14 = | 1.40 | | | |
| R15 = | 47.86 | D15 = | 3.50 | N9 = 1.58267 | ν9 = | 46.4 |
| R16 = | −863.62 | D16 = | 0.15 | | | |
| R17 = | 44.11 | D17 = | 7.68 | N10 = 1.61272 | ν10 = | 58.7 |
| R18 = | 279.75 | D18 = | 2.96 | | | |
| R19 = | −396.11 | D19 = | 4.67 | N11 = 1.72825 | ν11 = | 28.5 |
| R20 = | 39.49 | D20 = | 9.11 | | | |
| R21 = | 69.38 | D21 = | 3.00 | N12 = 1.66680 | ν12 = | 33.0 |
| R22 = | 97.08 | D22 = | 2.18 | N13 = 1.48749 | ν13 = | 70.1 |
| R23 = | 27.75 | D23 = | 34.08 | | | |

F {
| | | | | | | |
|---|---|---|---|---|---|---|
| R24 = | 67.11 | D24 = | 5.80 | N14 = 1.51742 | ν14 = | 52.4 |
| R25 = | −52.10 | D25 = | 2.02 | N15 = 1.83481 | ν15 = | 42.7 |
| R26 = | −128.37 | | | | | |

| f | 81.39 | 126.81 | 195.53 |
|---|---|---|---|
| D5 | 3.04 | 25.34 | 39.38 |
| D10 | 37.29 | 22.95 | 1.26 |
| D13 | 8.98 | 3.72 | 13.06 |

$f_F$ = 123.53   $f_R$ = 124.40

Numerical Example 3
F = 83.8–197.3  FNO = 1:4.5  2ω = 12.5°–28.9°

| | | | | | | |
|---|---|---|---|---|---|---|
| R1 = | 86.86 | D1 = | 2.60 | N1 = 1.80518 | ν1 = | 25.4 |
| R2 = | 45.00 | D2 = | 9.30 | N2 = 1.63930 | ν2 = | 44.9 |
| R3 = | −363.58 | D3 = | Variable | | | |
| R4 = | −1712.75 | D4 = | 1.45 | N3 = 1.77250 | ν3 = | 49.6 |
| R5 = | 60.48 | D5 = | 2.35 | | | |
| R6 = | −49.10 | D6 = | 2.50 | N4 = 1.77250 | ν4 = | 49.6 |
| R7 = | 26.12 | D7 = | 4.10 | N5 = 1.84666 | ν5 = | 23.9 |
| R8 = | 127.76 | D8 = | Variable | | | |

R {
| | | | | | | |
|---|---|---|---|---|---|---|
| R9 = | 349.71 | D9 = | 2.60 | N6 = 1.77250 | ν6 = | 49.6 |
| R10 = | −60.76 | D10 = | 0.15 | | | |
| R11 = | 52.73 | D11 = | 4.80 | N7 = 1.73500 | ν7 = | 49.8 |
| R12 = | −37.70 | D12 = | 1.50 | N8 = 1.84666 | ν8 = | 23.9 |
| R13 = | 1223.59 | D13 = | 1.60 | | | |
| R14 = | Stop | D14 = | 26.68 | | | |
| R15 = | 75.22 | D15 = | 2.99 | N9 = 1.68893 | ν9 = | 31.1 |
| R16 = | 276.89 | D16 = | 2.18 | N10 = 1.48749 | ν10 = | 70.1 |
| R17 = | 32.11 | D17 = | 24.87 | | | |

F {
| | | | | | | |
|---|---|---|---|---|---|---|
| R18 = | 106.47 | D18 = | 5.80 | N11 = 1.55671 | ν11 = | 58.7 |
| R19 = | −50.39 | D19 = | 2.01 | N12 = 1.80610 | ν12 = | 40.9 |
| R20 = | −141.54 | | | | | |

| f | 83.8 | 146.3 | 197.3 |
|---|---|---|---|
| D3 | 0.84 | 42.49 | 56.92 |
| D8 | 17.57 | 10.91 | 5.48 |

$f_F$ = 167.84   $f_R$ = 45.28

Numerical Example 4
F = 81.57–195.96  FNO = 1:4.0  2ω = 12.6°–29.7°

| | | | | | | |
|---|---|---|---|---|---|---|
| R1 = | 253.45 | D1 = | 3.00 | N1 = 1.80518 | ν1 = | 25.4 |
| R2 = | 91.71 | D2 = | 7.10 | N2 = 1.58913 | ν2 = | 61.0 |
| R3 = | −171.64 | D3 = | 0.12 | | | |
| R4 = | 76.21 | D4 = | 4.00 | N3 = 1.58913 | ν3 = | 61.0 |
| R5 = | 189.71 | D5 = | Variable | | | |
| R6 = | −297.10 | D6 = | 1.65 | N4 = 1.71300 | ν4 = | 53.8 |
| R7 = | 60.50 | D7 = | 3.42 | | | |
| R8 = | −73.78 | D8 = | 1.65 | N5 = 1.71300 | ν5 = | 53.8 |
| R9 = | 38.47 | D9 = | 4.10 | N6 = 1.80518 | ν6 = | 25.4 |
| R10 = | 281.86 | D10 = | Variable | | | |
| R11 = | 101.41 | D11 = | 1.70 | N7 = 1.64769 | ν7 = | 33.8 |
| R12 = | 34.35 | D12 = | 6.20 | N8 = 1.58913 | ν8 = | 61.0 |

-continued

Numerical Example 4
F = 81.57–195.96  FNO = 1:4.0  2ω = 12.6°–29.7°

| | | | | | | | | |
|---|---|---|---|---|---|---|---|---|
| | | R13 = | −131.00 | D13 = | Variable | | | |
| | | R14 = | Stop | D14 = | 1.83 | | | |
| | | R15 = | 45.99 | D15 = | 6.00 | N9 = 1.51823 | ν9 = 59.0 | |
| | | R16 = | −75.87 | D16 = | 1.00 | N10 = 1.72342 | ν10 = 38.0 | |
| | | R17 = | 148.29 | D17 = | 0.15 | | | |
| | | R18 = | 42.34 | D18 = | 3.80 | N11 = 1.51835 | ν11 = 60.3 | |
| | | R19 = | 364.18 | D19 = | 8.60 | | | |
| | | R20 = | 19.23 | D20 = | 2.00 | N12 = 1.68893 | ν12 = 31.1 | |
| R | | R21 = | 16.40 | D21 = | 19.50 | | | |
| | | R22 = | 107.65 | D22 = | 1.80 | N13 = 1.84666 | ν13 = 23.9 | |
| | F | R23 = | −419.91 | D23 = | 1.80 | N14 = 1.77250 | ν14 = 49.6 | |
| | | R24 = | 33.49 | D24 = | 17.50 | | | |
| | | R25 = | 48.88 | D25 = | 3.90 | N15 = 1.61800 | ν15 = 63.4 | |
| | | R26 = | −1183.49 | D26 = | 1.10 | N16 = 1.75520 | ν16 = 27.5 | |
| | | R27 = | 170.07 | | | | | |

| f | 81.57 | 127.09 | 195.96 |
|---|---|---|---|
| D5 | 3.04 | 25.34 | 39.38 |
| D10 | 37.29 | 22.95 | 1.26 |
| D13 | 8.98 | 3.72 | 13.06 |

$f_F = -68.21$   $f_R = 124.69$

Numerical Example 5
F = 82.1–198.3  FNO = 1:4.5  2ω = 12.5°–29.5°

| | | | | | | | | |
|---|---|---|---|---|---|---|---|---|
| | | R1 = | 86.87 | D1 = | 2.60 | N1 = 1.80518 | ν1 = 25.4 | |
| | | R2 = | 45.18 | D2 = | 9.30 | N2 = 1.63930 | ν2 = 44.9 | |
| | | R3 = | −366.55 | D3 = | Variable | | | |
| | | R4 = | −259.07 | D4 = | 1.45 | N3 = 1.77250 | ν3 = 49.6 | |
| | | R5 = | 68.23 | D5 = | 2.35 | | | |
| | | R6 = | −49.04 | D6 = | 2.50 | N4 = 1.77250 | ν4 = 49.6 | |
| | | R7 = | 26.78 | D7 = | 4.10 | N5 = 1.84666 | ν5 = 23.9 | |
| | | R8 = | 154.59 | D8 = | Variable | | | |
| | | R9 = | 765.88 | D9 = | 1.70 | N6 = 1.64769 | ν6 = 33.8 | |
| | | R10 = | 33.84 | D10 = | 6.20 | N7 = 1.58913 | ν7 = 61.0 | |
| | | R11 = | −50.25 | D11 = | 1.50 | | | |
| | | R12 = | Stop | D12 = | 1.83 | | | |
| | | R13 = | 46.00 | D13 = | 6.00 | N8 = 1.51633 | ν8 = 64.1 | |
| | | R14 = | −53.01 | D14 = | 1.00 | N9 = 1.72047 | ν9 = 34.7 | |
| | | R15 = | −630.24 | D15 = | 0.15 | | | |
| | | R16 = | 41.11 | D16 = | 3.80 | N10 = 1.51633 | ν10 = 64.1 | |
| R | | R17 = | 279.98 | D17 = | 10.87 | | | |
| | | R18 = | 19.88 | D18 = | 2.00 | N11 = 1.68893 | ν11 = 31.1 | |
| | | R19 = | 16.78 | D19 = | 22.62 | | | |
| | | R20 = | 129.31 | D20 = | 1.80 | N12 = 1.84666 | ν12 = 23.9 | |
| | F | R21 = | −410.45 | D21 = | 1.80 | N13 = 1.77250 | ν13 = 49.6 | |
| | | R22 = | 37.90 | D22 = | 23.36 | | | |
| | | R23 = | 45.78 | D23 = | 4.30 | N14 = 1.61800 | ν14 = 63.4 | |
| | | R24 = | 747.87 | D24 = | 1.10 | N15 = 1.75520 | ν15 = 27.5 | |
| | | R25 = | 152.87 | | | | | |

| f | 82.10 | 139.92 | 198.34 |
|---|---|---|---|
| D3 | 1.09 | 41.37 | 58.22 |
| D8 | 14.28 | 7.99 | 1.64 |

$f_F = -74.73$   $f_R = 42.89$

What I claim is:

1. A zoom lens comprising: from front to rear, a zoom section having a plurality of lens groups which move during zooming, and an image forming section which is stationary during zooming, focusing being performed by moving a lens group F of negative refractive power constituting part of said image forming section, satisfying the following condition:

$$0.4 < f_F/f_R < 4$$

wherein $f_R$ denotes the focal length of said image forming section, and $f_F$ denotes the focal length of said lens group F, said zoom lens further comprising a meniscus-shaped lens of forward convexity which is stationary during focusing and arranged on the object side of said lens group F and a lens of positive refractive power which is stationary during focusing and arranged on the image side, whereby focusing from an infinitely distant object to an object at a short object distance is performed by moving said lens group F toward the rear.

2. A zoom lens comprising:
a frontmost lens unit movable for zooming and stationary during focusing;
at least one movable lens unit movable simultaneously with, but independently from the frontmost lens unit, and an image forming lens section arranged at a position closer to the image than the movable lens unit and comprising a plurality of lens units;
wherein the focusing is performed by moving one of said plurality of lens units of the image forming lens section, and in which the lens movable for focusing has a negative refractive power and satisfies the following condition:

$$0.4 < |f_F/f_R| < 4$$

in which $f_F$ represents the focal length and $f_R$ represents the focal length of the image forming lens section.

* * * * *